Figure 1:
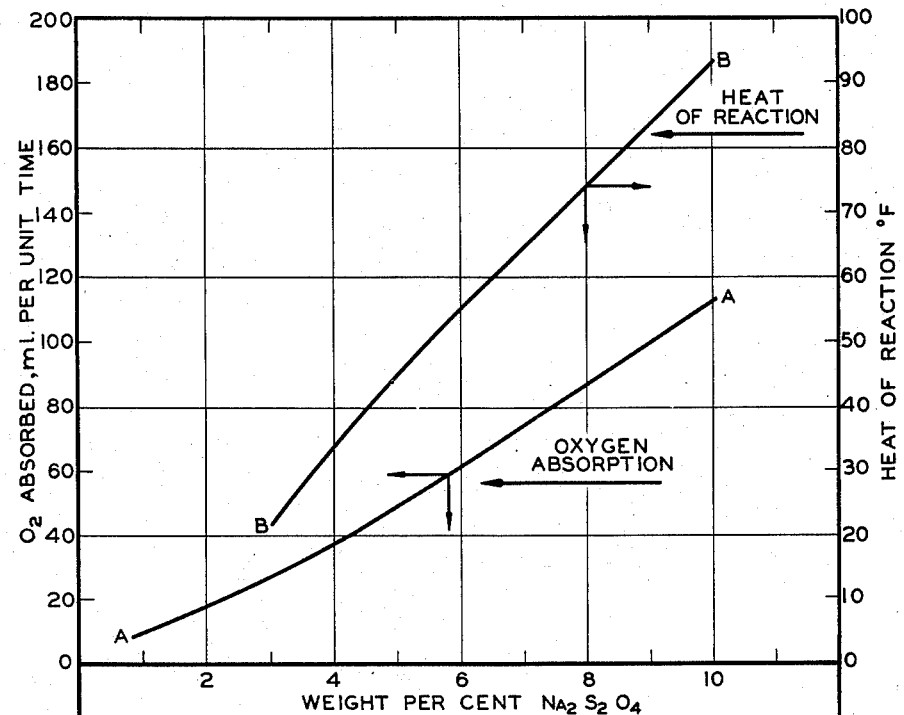
Figure 1:
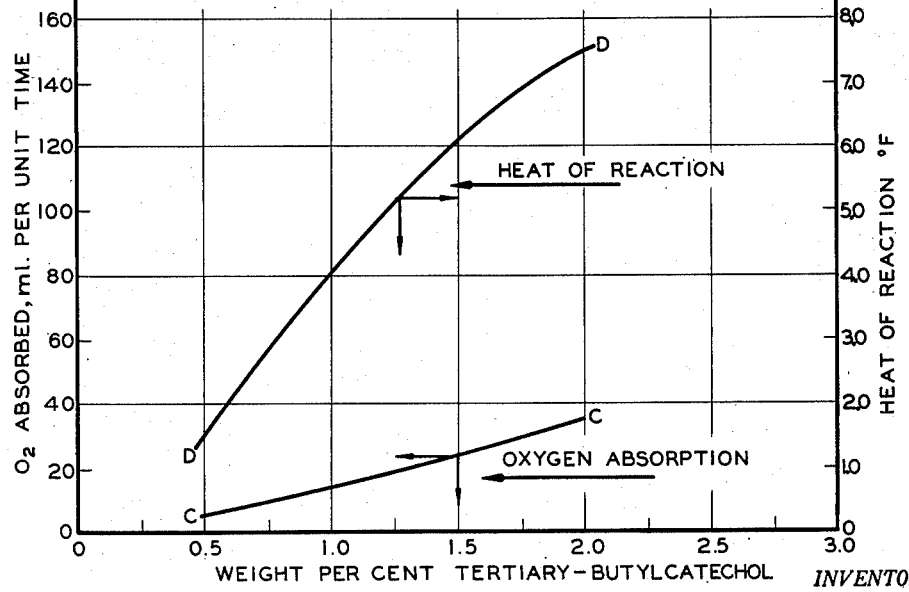

INVENTOR.
R.A. TIEDE

United States Patent Office 2,835,715
Patented May 20, 1958

2,835,715

AUTOMATIC CONTROL OF OXYGEN REMOVAL FROM PROCESS STREAMS

Raymond A. Tiede, Borger, Tex., assignor to Phillips Petroleum Company, a corporation of Delaware Application October 18, 1954, Serial No. 462,790

17 Claims. (Cl. 260—677)

This invention relates to automatic control of oxygen removal from process streams. In one aspect, this invention relates to a method and apparatus for measuring the oxygen absorbing capacity of a liquid. In a more specific aspect, this invention relates to the automatic control of an oxygen-removing unit in a process for handling a polymerizable material, such as an olefin.

It is known in the art that oxygen exerts deleterious effects upon many processes. Polymerization processes, in particular, are known to be adversely affected by the presence of oxygen in the polymerizable materials. Other reactions, such as hydrogenation, alkylation and isomerization are also known to be adversely affected by the presence of oxygen in the process materials.

Thus, oxygen is an undesirable constituent of process materials in many different chemical processes. These materials include liquid and gaseous hydrocarbons, such as gasoline and naphthas, paraffins and particularly olefins such as ethylene, propylene and 1,3-butadiene. In catalytic reactions involving these materials, oxygen is actually a poison for some catalysts.

Various materials are known to be oxygen scavengers or absorbing agents and have been used to remove oxygen from these process materials.

For example, sodium dithionite has been recommended as an oxygen scavenger for redox emulsion polymerization reactions. Other oxygen absorbing agents are resorcinol, pyrogallol, phloroglucinol, chlorohydroquinone, quinone and hydroquinone. Recently it has been found that alkaline solutions of alkali-metal hyposulfites or of tertiary-butylcatechol are excellent oxygen absorbing agents, especially for removing oxygen from olefin streams, such as ethylene and butadiene.

In the copending application of Thomas J. Kennedy and Raymond A. Tiede entitled "Removal of Oxygen From Hydrocarbon Streams," Serial No. 397,772, filed December 11, 1953, the use of an alkaline aqueous solution of an alkali-metal hyposulfite, such as sodium hyposulfite dissolved in sodium hydroxide, to remove oxygen from various hydrocarbon streams is disclosed and claimed. Also, in the copending application of Sig C. Fauske entitled "Removal of Oxygen From Streams Containing Diolefins and the Like," Serial No. 331,543, filed January 16, 1953, the use of an aqueous sodium hydroxide solution containing a high concentration of the sodium salt of tertiary-butylcatechol to remove oxygen from olefin streams is disclosed and claimed.

In the processes described in the above cited patent applications and in any process for removing oxygen from a process stream, additional quantities of the oxygen absorbing agent must be added continuously or intermittently to the oxygen-containing stream in order to maintain a preselected low concentration of oxygen in the process stream. Such addition of the oxygen absorbing agent is customarily based upon periodical laboratory analyses of the treated or untreated process stream, for example, by an Orsat analysis. Periodic analysis and periodic control of the addition of the oxygen absorbing agent is subject to the defects inherent in such non-continuous control of a process, such as a non-uniform oxygen content in the treated process stream. A need exists for a system for continuously analyzing the process stream and, in response to this continuous analysis, continuously controlling the addition of fresh oxygen absorbing agent in order to maintain the desired low concentration of oxygen in the process stream.

Accordingly it is an object of this invention to provide a method and means for automatically controlling the removal of oxygen from a process stream.

It is a further object to provide a method and apparatus for continuously determining the strength of an oxygen absorbing agent, and in response to the continuous determination, automatically controlling the addition of fresh oxygen absorbing agent to the process stream.

It is a still further object to provide a method and apparatus for the continuous measurement of the strength of an oxygen absorbing agent and in response thereto for continuously controlling the strength of the oxygen absorbing agent used to remove oxygen from an olefin, such as ethylene or 1,3-butadiene.

I have discovered a system for accomplishing the foregoing objects which is based on the discovery that the strength of an oxygen absorbing agent is proportional to the amount of oxygen which the oxygen absorbing agent can absorb. In accordance with this invention, the oxygen-absorbing agent is supplied to a reaction chamber at a constant rate of flow. A stream of oxygen is admitted to the reaction chamber at a constant pressure and I have found that the quantity of oxygen which flows into the reaction chamber under these conditions is the quantity of oxygen which reacts with the oxygen absorbing agent and is proportional to the strength of the oxygen absorbing agent. Also, in accordance with this invention, an apparatus is provided for carrying out the above-described reaction and for automatically controlling the addition of fresh oxygen-absorbing agent to a process stream in order to maintain a preselected low concentration of oxygen in the process stream.

The copolymerization of butadiene and styrene is a process which shows how the present invention can be used to good advantage. It has been observed in this polymerization reaction that the presence of oxygen in the butadiene causes the reaction to proceed erratically and, in some cases, can cause the polymerization to stop before the desired degree of conversion has been obtained. Tertiary-butylcatechol is conventionally used to prevent polymerization of the butadiene during storage and/or shipment to the copolymerization process. The above-cited application Serial No. 331,543 discloses that the undesired oxygen in the butadiene can be removed by increasing the content of tertiary-butylcatechol in the caustic scrubber used in treating the butadiene. It is there disclosed that the oxygen concentration in the scrubbed butadiene should be maintained between 0 and 5 parts per million and that it can be so maintained if the concentration of tertiary-butylcatechol in the caustic scrubber is maintained at at least 90 parts per million. An essential feature of this process is therefore the maintenance of a high concentration of tertiary-butylcatechol in the caustic scrubber. It is especially desired that this concentration be high enough to reduce the concentration of oxygen in the treated butadiene to below 5 parts per million.

Figure 2:
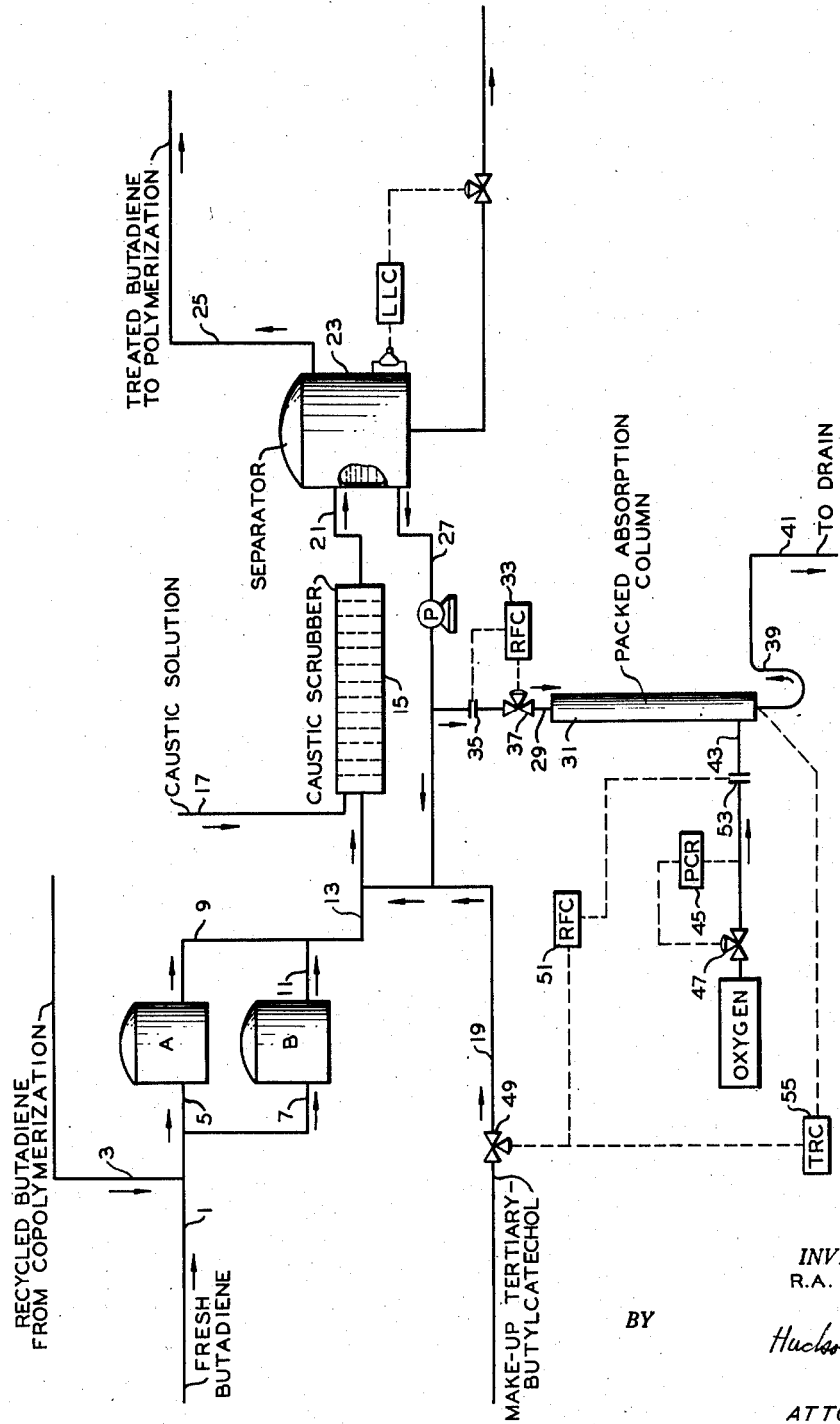

In order to determine how much tertiary-butylcatechol must be added to the caustic scrubber in order to maintain the desired low concentration of oxygen, laboratory analysis is made of the treated or untreated butadiene to determine the oxygen content and the amount of tertiary-butylcatechol which is added to the caustic scrubber is based upon this laboratory analysis. Such a procedure permits surges of oxygen to go through the system without being removed and, also, gradually increasing amounts of oxygen may not be detected until several hours after the increase has occurred. The method and means of this invention, as applied to such a commercial process, overcomes these disadvantages and will be better understood when considered in conjunction with the accompanying drawings wherein:

Figure 1 is a series of graphs based on data in Example I, hereinafter described, which show that the strength of an oxygen absorbing agent is proportional to the quantity of oxygen which the agent absorbs and to the heat of reaction when the oxygen absorbing agent is reacted with oxygen; and Figure 2 is a schematic flow diagram illustrating the use of this invention to control the automatic removal of oxygen from a process stream.

EXAMPLE I

The oxygen absorbing agent, an alkaline solution of sodium hyposulfite or tertiary-butylcatechol, was admitted to the top of an absorption column at a constant, known rate of flow and a constant temperature. The absorption column used was a glass column, ⅜ inch diameter by 3 feet, 6 inches long which was packed with ⅛ inch glass helices. A liquid trap and drain was attached to the bottom of the column.

Oxygen was admitted to the column near the bottom at a constant, known pressure. A pressure regulator on the oxygen inlet line provided a constant pressure of 20 millimeters of water and a flowmeter on the oxygen inlet line indicated the quantity of oxygen passing into the absorption column. A temperature indicating device was also attached to the bottom of the absorption column to indicate the heat of reaction as reflected by the temperature rise taking place due to the reaction of the oxygen absorbing agent with oxygen in the column.

Runs 1 through 5 in Table I, below, show the quantity of oxygen absorbed per unit time when a constant flow, 10 milliliters per minute, of a caustic solution of sodium hyposulfite was passed through the absorption column. Each of these runs was conducted for the same length of time.

Runs 6 through 8 show the heat of reaction which was observed when the constant pressure of oxygen was maintained on the absorption column and the flow rate of the sodium hyposulfite solution was maintained at a constant value.

Runs 9 through 11 show the quantity of oxygen absorbed per unit time when a constant flow, 20 milliliters per minute, of a caustic solution of tertiary-butylcatechol was passed through the absorption column. Each of these runs was conducted for the same length of time.

Runs 12 through 14 show the heat of reaction which was observed when the constant pressure of oxygen was maintained on the absorption column and the flow rate of the tertiary-butylcatechol solution was maintained at a constant value.

Table I

| Run No. | Oxygen Absorbing Agent | Concentration of Oxygen Absorbing Agent, Weight Percent | Quantity of Oxygen Absorbed, ml. per Unit Time | Heat of Reaction (Temperature Rise, ° F.) |
| --- | --- | --- | --- | --- |
| 1 | Sodium hydrosulfite | 1.0 | 8 | |
| 2 | do | 2.5 | 23 | |
| 3 | do | 5.0 | 48 | |
| 4 | do | 9.0 | 98 | |
| 5 | do | 10.0 | 113 | |
| 6 | do | 2.5 | | 21.5 |
| 7 | do | 5.0 | | 45.0 |
| 8 | do | 10.0 | | 93.5 |
| 9 | Tertiary-butylcatechol | 0.5 | 5 | |
| 10 | do | 1.0 | 15 | |
| 11 | do | 2.0 | 35 | |
| 12 | do | 0.5 | | 1.5 |
| 13 | do | 1.0 | | 4.0 |
| 14 | do | 2.0 | | 7.5 |

The data reported above in Table I show that the strength of the oxygen absorbing agent is proportional to the quantity of oxygen absorbed and to the heat of reaction in the oxygen absorbing column. These data are plotted in Figure 1, line A—A representing the data for runs 1 through 5, line B—B representing the data for runs 6 through 8, line C—C representing the data for runs 9 through 11, and line D—D representing the data for runs 12 through 14.

EXAMPLE II

Runs were made which demonstrate the effectiveness of other oxygen absorbing agents, described hereinbefore, to remove oxygen from a stream of ethylene. A stream of ethylene was passed upwardly at 400 p. s. i. g. through a reaction zone, 2 inches in diameter by 5 feet long which contained a caustic solution of tertiary-butylcatechol or pyrogallol. The temperature of the reaction zone was maintained at 80° F. for run No. 1 and 100° F. for run No. 2. The data for these runs are reported below in Table II.

Table II

| | Oxygen Absorption Solution | | | Volume ethylene, liters per hr. | Feed, parts per million oxygen | Effluent, parts per million oxygen |
| --- | --- | --- | --- | --- | --- | --- |
| | Volume of 10% NaOH, ml. | Grams tertiary-butyl-catechol | Grams pyro-gallol | | | |
| Run 1 | 3100 | 100 | | 47 | 247 | 11 |
| Run 2 | 3100 | | 100 | 54 | 247 | 3.2 |

Referring now to Figure 2, the utilization of my invention to automatically control the removal of oxygen from a process stream is shown. The process which is used for illustrating my invention in Figure 2 is the preparation of butadiene for subsequent polymerization reactions, such as the copolymerization of butadiene with styrene.

Fresh butadiene in line 1 and recycled butadiene from the copolymerization reaction in line 3 is fed to blending tanks A and B via lines 5 and 7. From tanks A and B the blend, suitably prepared, is passed by means of lines 9 and/or 11 and line 13 into a caustic scrubber 15. A caustic solution is admitted to the scrubber 15 through line 17 and tertiary-butylcatechol is admitted to the scrubber 15 through line 19 and line 13. The caustic removes tertiary-butylcatechol from the butadiene and, by maintaining a sufficiently high concentration of tertiary-butylcatechol in the caustic scrubber, oxygen is also removed from the butadiene by the alkali metal salt of tertiary-butylcatechol. The combined streams of butadiene, caustic and tertiary-butylcatechol pass from the scrubber 15 through line 21 to a separator vessel 23. The caustic solution containing tertiary-butylcatechol separates from the butadiene in separator 23 in a lower phase and the upper phase containing the treated butadiene is passed through line 25 to the copolymerization process. The treated butadiene in line 25 can be water-washed by means not shown to remove any entrained caustic therefrom. The caustic solution containing tertiary-butylcatechol in the lower phase in separator 23 is recycled through line 27, line 19 and line 13 to the caustic scrubber 15. As has been explained hereinbefore, fresh tertiary-butylcatechol must be continuously or intermittently added to the recycled caustic solution in line 27 in order that a sufficiently high concentration of tertiary-butylcatechol is maintained in the scrubber 15. This addition of fresh tertiary-butylcatechol is accomplished automatically, in accordance with this invention, as will now be described.

A sample stream of the partially spent caustic solution containing tertiary-butylcatechol in line 27 is withdrawn and passed through a line 29 to a packed absorption column 31. A rate of flow controller 33, comprising an orifice 35 and a motor valve 37 connected in line 29, supplies the sample stream in line 29 to the absorption column 31 at a constant rate of flow. The sample stream leaves the absorption column through an outlet at the bottom, a liquid trap 39 and through a line 41 to a drain or other suitable use. Oxygen or other oxygen-containing gas, such as air, is admitted to the absorption column 31 at a point near the outlet of the sample stream through a line 43. A pressure controller 45 connected to line 43 actuates a motor valve 47 in line 43 and thereby provides a stream of oxygen to the absorption column 31 at a constant pressure.

In accordance with this invention, a motor valve 49 in line 19 regulates the flow of makeup tertiary-butyl-catechol to the caustic scrubber and motor valve 49 is automatically controlled by the reaction proceeding in the absorption column 31. This is accomplished by one of two means. A rate of flow controller 51, comprising an orifice 53 in line 43, monitors the rate of flow of oxygen in line 43 and, in response thereto, controls motor valve 49 in line 19. Alternatively, a temperature recorder controller 55 is connected to the sample outlet in absorption column 31 and monitors the heat of reaction occurring in column 31 due to the reaction of the sample stream with oxygen. In response to the heat of reaction so monitored, temperature recorder controller 55 actuates motor valve 49 in line 19 so as to admit the proper amount of fresh tertiary-butyl-catechol to the scrubber 15.

In the case where an alkaline aqueous solution of an alkali-metal hyposulfide is used as the oxygen absorbing agent, such as sodium hyposulfite, the granular sodium hyposulfite is fed from a hopper having a vibratory feeder into a mix tank wherein the alkaline solution of the hyposulfite is prepared. In accordance with this invention, the vibratory feeder is controlled by either rate of flow controller 51 or temperature-recorder-controller 55 and the addition of make-up hyposulfite is automatically controlled in accordance with the strength of the oxygen absorbing agent, as described above.

It will be apparent from the foregoing description and the accompanying drawings that my invention broadly comprises a system for measuring the oxygen absorbing capacity of a fluid stream, comprising the oxygen reaction chamber having a suitable packing material therein, means for passing a sample stream through the reaction chamber at a constant rate of flow, means for admitting a stream of oxygen to the reaction chamber at a constant pressure and means for measuring the quantity of oxygen which is admitted to the reaction chamber under these conditions. The data reported in Example I clearly show that the quantity of oxygen admitted to the reaction chamber is proportional to the strength of the oxygen absorbing solution. Thus, my invention further comprises a method and means for automatically introducing needed amounts of the oxygen absorbing agent into the process stream in response to the quantity of oxygen which is absorbed in the oxygen absorption column.

It will be further apparent from the foregoing description that my invention broadly comprises a continuous process wherein a material (A) is contacted with a process material (B) to react therewith and thereby remove an ingredient (C) in said process material B to thereby produce an ingredient C-free process material B(D) containing reacted and unreacted material A(E), wherein said material E is thereafter removed from said material D and returned to said process material B for reuse in reacting with and removing ingredient C from said process material B, and wherein fresh, unreacted material A(F) is continuously added to said material E to maintain a preselected minimum concentration of said material F in said material E, a method for continuously determining the concentration of unreacted material A in material E and, in accordance therewith, for continuously controlling the addition of material F to said material E to maintain said preselected minimum concentration of said material F in said material E, which comprises, continuously passing a sample (G) of said material E through a reaction zone, continuously passing a variable but determinable amount of material (H) comprising ingredient C through said reaction zone to completely react sample G with ingredient C in material H, continuously detecting the amount of ingredient C in material H required for said reaction of ingredient C in material H with material E, and continuously controlling the addition of fresh, unreacted material F to material E in accordance with the amount of ingredient C in material H required for the last-mentioned reaction.

Reasonable variation and modification are possible within the scope of the foregoing disclosure and the appended claims to this invention. It is again pointed out that my invention is applicable, broadly, to the removal of oxygen from any fluid stream and that important applications of the invention are in processes for the removal of oxygen from ethylene or 1,3-butadiene.

I claim:

1. An apparatus for measuring the oxygen absorbing capacity of a fluid stream which comprises an oxygen reaction chamber having a sample inlet in one end and a sample outlet in the other end, means for passing said fluid stream through said inlet, reaction chamber and outlet at a constant rate of flow, means for admitting a stream of oxygen at a constant pressure into said reaction chamber at a point near said outlet to react with said fluid stream therein, and means for measuring the quantity of oxygen admitted into said oxygen reaction chamber.

2. An apparatus for measuring the oxygen absorbing capacity of a fluid stream which comprises an elongated oxygen reaction chamber having a sample inlet in one end and a sample outlet in the other end, liquid-vapor contacting means in said reaction chamber, means for passing said fluid stream through said inlet, reaction chamber and outlet at a constant rate of flow, means for admitting a stream of oxygen at a constant pressure into said reaction chamber at a point near said outlet to react with said fluid stream therein, and means for measuring the quantity of oxygen admitted into said oxygen reaction chamber.

3. An apparatus in accordance with claim 2 wherein said means for measuring the quantity of oxygen admitted to said reaction chamber comprises a rate of flow controller connected to said means for admitting said stream of oxygen into said chamber.

4. An apparatus in accordance with claim 2 wherein said means for measuring the quantity of oxygen admitted to said reaction chamber comprises a temperature recorder-controller for measuring the heat of reaction of said fluid stream with oxygen.

5. An apparatus for automatically controlling the addition of an oxygen-absorbing agent to a fluid stream to maintain a preselected minimum concentration of said oxygen-absorbing agent in said fluid stream, which comprises, an elongated, vertical oxygen reaction chamber having a sample inlet near the top end and a sample outlet near the bottom end, a first conduit means for conveying a sample of said fluid stream into said oxygen reaction chamber inlet, a first rate of flow controlling means in said first conduit means for admitting said sample to said oxygen reaction chamber at a constant rate of flow, a second conduit means connected at one end to a source of oxygen and at the other end to said reaction chamber at a point near said sample outlet for conveying oxygen into said reaction chamber, a pressure controlling means in said second conduit means for admitting oxygen to the reaction chamber at a constant pressure, means for measuring the quantity of oxygen admitted to said reaction chamber through said second conduit, and means responsive to said oxygen measuring means for automatically controlling said addition of said oxygen absorbing agent to said fluid stream to maintain said preselected minimum concentration of said oxygen-absorbing agent in said fluid stream.

6. An apparatus in accordance with claim 5 wherein said means for measuring the quantity of oxygen admitted to said reaction chamber comprises a rate of flow controller installed in said second conduit for measuring the rate of flow of oxygen into said reaction chamber.

7. An apparatus in accordance with claim 5 wherein said means for measuring the quantity of oxygen admitted to said reaction chamber comprises a temperature recorder-controller connected to said sample outlet for measuring the heat of reaction of oxygen with said fluid stream sample.

8. A method for automatically controlling the addition of fresh oxygen-absorbing material to an at least partially spent oxygen-absorbing material which comprises, contacting a sample of the at least partially spent oxygen-absorbing material with oxygen under conditions such that said sample is completely reacted with oxygen, measuring the amount of oxygen required for said complete reaction, and in accordance therewith, automatically controlling the addition of fresh oxygen absorbing material to the at least partially spent oxygen-absorbing material.

9. In a continuous process wherein a material (A) is contacted with a process material (B) to react therewith and thereby remove an ingredient (C) in said process material B to thereby produce an ingredient C-free process material B(D) containing reacted and unreacted material A(E), wherein said material E is thereafter removed from said material D and returned to said process material B for reuse in reacting with and removing ingredient C from said process material B, and wherein fresh, unreacted material A(F) is continuously added to said material E to maintain a preselected minimum concentration of said material F in said material E, a method for continuously determining the concentration of unreacted material A in material E and, in accordance therewith, for continuously controlling the addition of material F to said material E to maintain said preselected minimum concentration of said material F in said material E, which comprises, continuously passing a sample (G) of said material E through a reaction zone, continuously passing a variable but determinable amount of material (H) comprising ingredient C through said reaction zone to completely react sample G with ingredient C in material H, continuously detecting the amount of ingredient C in material H required for said reaction of ingredient C in material H with material E, and continuously controlling the addition of fresh, unreacted material F to material E in accordance with the amount of ingredient C in material H required for the last-mentioned reaction.

10. In a continuous process for removing oxygen from a fluid stream wherein said fluid stream is contacted in a contacting zone with an oxygen-absorbing material and wherein said oxygen-absorbing material is thereafter separated from said fluid stream and recycled to said contacting zone, a method for continuously adding make-up oxygen-absorbing material to said recycled oxygen-absorbing material to maintain a preselected concentration of fresh oxygen-absorbing material in said contacting zone, which comprises, passing a sample of said recycled oxygen-absorbing material at a constant rate of flow through an oxygen reaction zone, maintaining a constant pressure of an oxygen-containing gas on said oxygen reaction zone to thereby completely react said sample with oxygen, measuring the amount of oxygen reacting in said oxygen reaction zone, and in accordance therewith controlling the addition of make-up oxygen-absorbing material to said recycled oxygen-absorbing material.

11. In a continuous process for removing oxygen from a fluid stream wherein said fluid stream is contacted in a contacting zone with an oxygen-absorbing material and wherein said oxygen-absorbing material is thereafter separated from said fluid stream and recycled to said contacting zone, a method for continuously adding make-up oxygen-absorbing material to said recycled oxygen-absorbing material to maintain a preselected concentration of fresh oxygen-absorbing material in said contacting zone, which comprises, passing a sample of said recycled oxygen-absorbing material at a constant rate of flow through an oxygen reaction zone, maintaining a constant pressure of an oxygen-containing gas on said oxygen reaction zone to thereby completely react said sample with oxygen, measuring the heat of reaction for the reaction of said sample with oxygen in the oxygen reaction zone and controlling the addition of make-up oxygen-absorbing material to said recycled oxygen-absorbing material in accordance with said heat of reaction in said oxygen reaction zone so measured.

12. In a method for removing oxygen from an olefin stream by contacting said stream in a contacting zone with an oxygen-absorbing agent consisting essentially of an alkaline aqueous solution of an alkali-metal hyposulfite, wherein said oxygen-absorbing agent is thereafter separated from said olefin stream and recycled to said contacting zone, a method for continuously adding make-up alkali-metal hyposulfite to said recycled oxygen-absorbing agent to maintain a preselected concentration of said alkali-metal hyposulfite in said contacting zone, which comprises, passing a sample of said recycled oxygen-absorbing agent at a constant rate of flow through an oxygen reaction zone, maintaining a constant pressure of oxygen on said oxygen reaction zone to thereby completely react said sample with oxygen, measuring the amount of oxygen which reacts with said sample, and, in accordance therewith, controlling the addition of make-up alkali-metal hyposulfite to said recycled oxygen-absorbing agent.

13. A method in accordance with claim 12 wherein the amount of oxygen which reacts in said oxygen reaction zone is measured by measuring the rate of flow of said oxygen into said oxygen reaction zone.

14. A method in accordance with claim 12 wherein the amount of oxygen which reacts in said oxygen reaction zone is measured by measuring the heat of reaction for the reaction of oxygen with said sample of the recycled oxygen-absorbing agent in said oxygen reaction zone.

15. A method in accordance with claim 12 wherein said olefin stream is ethylene.

16. A method in accordance with claim 12 wherein said olefin stream is 1,3-butadiene.

17. In a method for removing oxygen from an olefin stream by contacting said stream in a contacting zone with an oxygen-absorbing agent consisting essentially of an alkali metal hydroxide solution containing an alkali metal salt of tertiary-butylcatechol, wherein said oxygen-absorbing agent is thereafter separated from said olefin stream and recycled to said contacting zone, a method for continuously adding make-up tertiary-butylcatechol to said contacting zone to maintain a preselected concentration of said salt of tertiary-butylcatechol in said contacting zone, which comprises, passing a sample stream of said recycled oxygen-absorbing agent at a constant rate of flow through an oxygen reaction zone, maintaining a constant pressure of oxygen on said oxygen reaction zone to thereby completely react said sample stream with oxygen, measuring the amount of oxygen which reacts with said sample stream and, in accordance therewith, controlling the addition of make-up tertiary-butylcatechol to said recycled oxygen-absorbing agent.

(References on following page)

References Cited in the file of this patent

UNITED STATES PATENTS

| | | |
|---|---|---|
| 1,669,944 | McMichael | May 15, 1928 |
| 2,047,985 | Weir | July 21, 1936 |
| 2,095,473 | Keunecke | Oct. 12, 1937 |
| 2,118,567 | Milas et al. | May 24, 1938 |
| 2,186,688 | Walker | Jan. 9, 1940 |
| 2,222,870 | Kniskern | Nov. 26, 1940 |
| 2,250,468 | Cockerille | July 29, 1941 |
| 2,402,113 | Hatch et al. | June 11, 1946 |
| 2,565,354 | Cohen | Aug. 21, 1951 |
| 2,631,175 | Crouch | Mar. 10, 1953 |

OTHER REFERENCES

Chem. and Met. Engineering, May 1943, pages 108–114, 143 and 144.

Chem. and Met. Engineering, May 1943, pages 115–128.